No. 707,682. Patented Aug. 26, 1902.
F. A. FAIRBROTHER, Jr.
FASTENING DEVICE.
Application filed Nov. 14, 1901.
(No Model.)
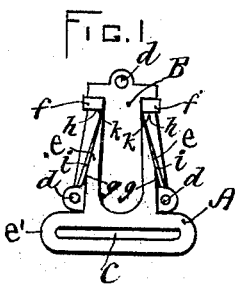
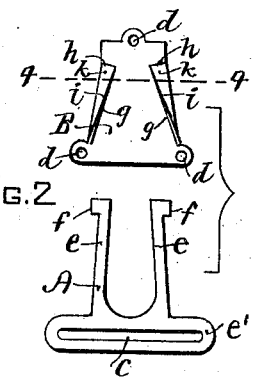
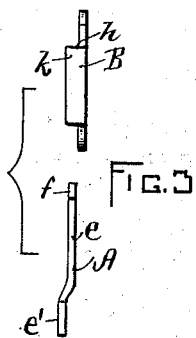
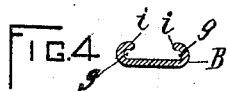
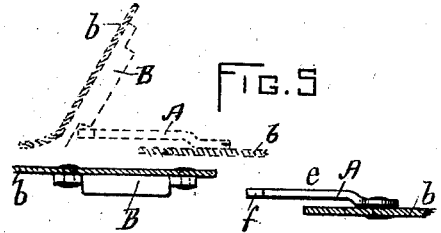
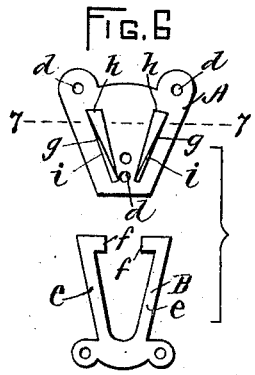
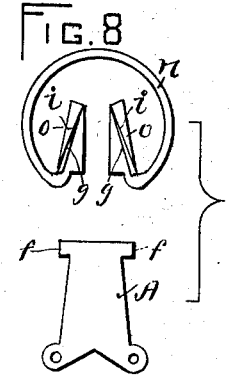
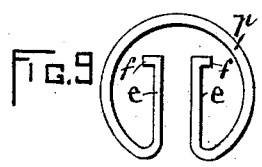
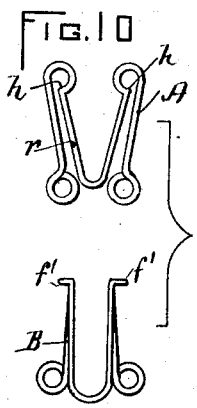
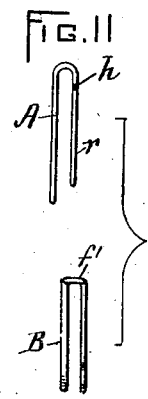
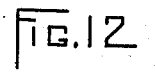
WITNESSES
Henry E Reynolds
John Mitchell
INVENTOR
Frederic A. Fairbrother Jr.
per S. Scholfield
ATTY.

United States Patent Office.

FREDERIC A. FAIRBROTHER, JR., OF PROVIDENCE, RHODE ISLAND.

FASTENING DEVICE.

SPECIFICATION forming part of Letters Patent No. 707,682, dated August 26, 1902.

Application filed November 14, 1901. Serial No. 82,304. (No model.)

*To all whom it may concern:*

Be it known that I, FREDERIC A. FAIRBROTHER, Jr., a citizen of the United States, residing at Providence, in the State of Rhode Island, have invented a new and useful Improvement in Fastening Devices, of which the following is a specification.

My invention relates to an improved fastening device adapted for use upon various articles, such as garments, gloves, belts, or similar articles; and the object of my invention is to provide a fastening the opposite members of which can be either engaged or disengaged by very simple motions when the article to which it is attached is tightly drawn, no slackness in the garment, belt, or other article being required to perform either the operation of engagement or disengagement, and while this invention admits of various forms of construction the several forms shown in the accompanying drawings will serve to exemplify the important points of the invention.

Figure 1 represents a face view of one form of the fastening device, showing the parts in engagement with each other. Fig. 2 represents a face view of the parts when separated from each other and in position to be engaged. Fig. 3 represents an edge view of the separated parts shown in Fig. 2. Fig. 4 represents a section taken in the line 4 4 of Fig. 2. Fig. 5 represents an edge view of the separated parts as attached to the opposite flaps of a garment or other article and in position for engagement and also illustrating by dotted lines the method of disengagement. Fig. 6 represents a face view of the separated parts, showing another form of the invention. Fig. 7 represents a transverse section taken in the line 7 7 of Fig. 6. Fig. 8 represents a face view of the separated parts, showing another form of the invention. Fig. 9 represents a face view of another form of the male member of the fastener. Fig. 10 represents a face view of the separated parts of the device when made of bent wire. Fig. 11 represents an edge view of the same. Fig. 12 represents an end view of the female member of the fastening shown in Fig. 10.

In the drawings Figs. 1, 2, 3, and 4, A represents the male member, and B the female member, of the fastening, the said member A being in this instance provided with the slot or eye $c$, by means of which it can be readily attached to the end of a belt, and the member B provided with the perforations $d\ d\ d$ for attachment to the opposite end of the belt by means of stitches or rivets. The member A is provided with two spring-arms $e\ e$, having at their forward ends the outwardly-directed studs $f\ f$, and the member B is preferably made of one piece of sheet metal, so formed as to make inwardly-directed runways $g\ g$, adapted to receive the arms $e\ e$ of the member A, the said runways $g\ g$ being made shorter than the length of the arms $e\ e$ of the member A, so that when the two members are forced together the outwardly-projecting studs $f\ f$ will be thrown outward by the resilience of the arms $e\ e$ and engage with the shoulders $h\ h$, formed at the end of the runway, as shown in Fig. 1. The tapering runways $g\ g$ are formed by turning up the edges of the sheet-metal blank and having the edges $i\ i$ of the turned-up portions of still greater inward inclination than that of the runways $g\ g$, so as to cover the arms $e\ e$ of the member A only at their forward ends, as shown in Fig. 1. The arms $e\ e$ of the member A are preferably offset from the plane of the attaching-base $e'$, as shown in the edge view Fig. 3 and when the parts A B are attached to the flaps $b\ b$ of a garment, as shown in Fig. 5, then by forcing the parts A and B together the studs $f\ f$ of the spring-arms $e\ e$ will engage with the tapering runways $g\ g$, thus causing the inward deflection of the said arms until they are freed from such deflection by the arrival of the said studs $f\ f$ past the ends $k$ of the runways, when the outward springing of the arms $e\ e$ will serve to cause the engagement of the said studs with the shoulders $h\ h$ to hold the members A and B together; and in order to separate these members from each other it is only necessary to raise the outer flap $b$ of the garment to an inclined position, as indicated by the dotted lines in Fig. 5, so that the inclined edges $i\ i$ may cause the inward movement of the arms $e\ e$, and thus effect the release of the studs $f\ f$ from the shoulders $h\ h$ by a continued backward movement, and this release may be effected without increasing the strain upon the garment or other article to which the fastener is attached.

Another form of the fastening device is shown in Fig. 6, in which the male member A is provided with outwardly-expanding runways $g$ $g$, having elevated edges $i$ $i$, as shown in Fig. 7, the female member B in this instance being provided with the spring-arms $e$ $e$ and the inwardly-directed studs $f$ $f$, the said studs being adapted for engagement with the runways $g$ $g$ and for engagement with the shoulders $h$ $h$ at the ends of the said runways, and in this case, as in that of the device shown in Fig. 1, the inclined edges $i$ $i$ will serve to effect the release of the studs $f$ $f$ from the shoulders $h$ $h$ at the end of the runways $g$ $g$.

Another form of the fastening device is shown in Fig. 8, in which the male member A of the fastening is rigidly constructed of sheet metal and provided with the outwardly-extending studs $f$ $f$, and the female member B is made in the form of a circular spring $n$ and provided with the yielding inwardly-extending arms $o$ $o$, upon which are formed the runways $g$ $g$, with the inclined edges $i$ $i$, which are adapted to cause the release of the parts of the fastening from their locking engagement, as before described.

Another form of the male member of the fastener is shown in Fig. 9, in which the yielding arms $e$ $e$ and studs $f$ $f$ are connected with each other by means of the circular spring $p$, and when a male member of this form of construction is employed with a female member of the construction shown in Fig. 8 both members will have a yielding action.

Another form of construction is shown in Figs. 10 and 11, in which the parts are made of wire, whereby both members are of yielding construction, the male member A being provided with the wedge-formed tongue $r$, having the retaining-shoulders $h$ $h$, while the female member B is provided with the engaging loops $f'$ $f'$, which perform the same locking function as the studs $f$ $f$ in the forms of construction before described.

Instead of securing the parts of the fastening device by means of stitches or rivets to the articles to which they are attached they may be secured thereto by means of clenched integral spurs, as common in such devices.

I claim as my invention—

In a fastening device, the combination of male and female members one of which is yielding and provided with opposite studs, and the other with engaging shoulders adapted to be engaged by said studs, the latter member being also provided with oppositely-inclined edges which serve to cause the release of the members from each other, substantially as described.

FREDERIC A. FAIRBROTHER, JR.

Witnesses:
SOCRATES SCHOLFIELD,
HENRY E. REYNOLDS.